(12) United States Patent
Koller et al.

(10) Patent No.: US 10,684,307 B2
(45) Date of Patent: Jun. 16, 2020

(54) IMAGING A GAP BETWEEN SAMPLE AND PROBE OF A SCANNING PROBE MICROSCOPE IN A SUBSTANTIALLY HORIZONTAL SIDE VIEW

(71) Applicant: Anton Paar GmbH, Graz (AT)

(72) Inventors: Daniel Koller, Graz (AT); Alberto Gomez-Casado, Seiersberg-Pirka (AT); Markus Brandner, Raaba-Grambach (AT)

(73) Assignee: Anton Paar GmbH, Graz (AT)

( * ) Notice: Subject to any disclaimer, the term of this patent is extended or adjusted under 35 U.S.C. 154(b) by 49 days.

(21) Appl. No.: 15/817,448

(22) Filed: Nov. 20, 2017

(65) Prior Publication Data

US 2018/0143221 A1    May 24, 2018

(30) Foreign Application Priority Data

Nov. 22, 2016   (EP) .................................. 16200047

(51) Int. Cl.
| | | |
|---|---|---|
| *G01Q 20/02* | (2010.01) | |
| *G01Q 10/06* | (2010.01) | |
| *G01Q 30/02* | (2010.01) | |
| *G01Q 10/00* | (2010.01) | |

(52) U.S. Cl.
CPC ............ *G01Q 20/02* (2013.01); *G01Q 10/00* (2013.01); *G01Q 10/06* (2013.01); *G01Q 30/02* (2013.01)

(58) Field of Classification Search
None
See application file for complete search history.

(56) References Cited

U.S. PATENT DOCUMENTS

| | | | | |
|---|---|---|---|---|
| 5,024,529 A | * | 6/1991 | Svetkoff ................ | G01B 11/02 356/3.04 |
| 5,254,854 A | * | 10/1993 | Betzig .................... | B82Y 20/00 250/234 |
| 5,448,399 A | | 9/1995 | Park et al. | |
| 5,672,816 A | | 9/1997 | Park et al. | |
| 5,705,814 A | | 1/1998 | Young et al. | |
| 5,838,000 A | * | 11/1998 | Mertesdorf ............ | B82Y 20/00 250/234 |
| 6,489,611 B1 | | 12/2002 | Aumond et al. | |
| 8,359,661 B2 | | 1/2013 | Tachizaki et al. | |

(Continued)

FOREIGN PATENT DOCUMENTS

| | | |
|---|---|---|
| EP | 1 055 901 A2 | 11/2000 |
| JP | H11 44693 A | 2/1999 |

(Continued)

OTHER PUBLICATIONS

Yasushi Inouye et al.: "Near-Field Scanning Optical Microscope With a Metallic Probe Tip" Optics Letters, vol. 19, No. 3, Feb. 1, 1994, pp. 159-161.

(Continued)

*Primary Examiner* — James Choi
(74) *Attorney, Agent, or Firm* — Robert A. Blaha; Smith Tempel Blaha LLC

(57) ABSTRACT

A scanning probe microscope analyses a sample by moving a probe and the sample relative to one another. The scanning probe microscope includes a detection unit for detecting an image of a gap between the sample and the probe in a substantially horizontal side view.

11 Claims, 2 Drawing Sheets

(56) References Cited

U.S. PATENT DOCUMENTS

| | | |
|---|---|---|
| 8,813,261 B2 | 8/2014 | Iyoki et al. |
| 9,081,028 B2 | 7/2015 | Meyer |
| 2010/0205699 A1 | 8/2010 | Tachizaki et al. |

FOREIGN PATENT DOCUMENTS

| | | | |
|---|---|---|---|
| JP | 2007170862 A * | 7/2007 | ........... G01Q 30/025 |
| JP | 2007170862 A | 7/2007 | |
| JP | 2011247842 A | 12/2011 | |
| JP | 2015175626 A | 10/2015 | |
| WO | WO 2008147120 A2 | 12/2008 | |
| WO | WO 2016065366 A1 | 4/2016 | |

OTHER PUBLICATIONS

Driesen W. et al. Flexible MicroManipulation Platform Based on Tethered cm3-Sized Mobile Micro Robots, Robotics and Biometrics (ROBIO), 2005 IEEE International Conference on Robotics, pp. 145-150.

Lai, Lei-Jie, et al. "Development of an Automatic Approaching System for Electrochemical Nanofabrication Using Visual and Force-Displacement Sensing," Sensors 2012, Jun. 25, 2012, pp. 8465-8476.

Office Action, Application No. 16 200 047.5, European Patent Office, dated Aug. 23, 2018, pp. 1-7.

Anonymous, "Telecentric Lens," Wikipedia, Jun. 15, 2018, retrieved from http://en.wikipedia.org/wiki/Telecentric_lens [retrieved on Jul. 3, 2018], pp. 1-3.

\* cited by examiner

IMAGING A GAP BETWEEN SAMPLE AND PROBE OF A SCANNING PROBE MICROSCOPE IN A SUBSTANTIALLY HORIZONTAL SIDE VIEW

CROSS-REFERENCE TO RELATED APPLICATIONS

This application claims the benefit of the filing date of European Patent Application No. 16 200 047.5 filed 22 Nov. 2016, the disclosure of which is hereby incorporated by reference.

TECHNICAL FIELD

The invention relates to a scanning probe microscope (SPM), and in particular concerns an atomic force microscope (AFM). The invention also relates to a method of monitoring a gap between a probe and a sample of a scanning probe microscope.

TECHNOLOGICAL BACKGROUND

In an SPM or AFM, prior to scanning the sample surface, usually two engagement steps take place. In a first or coarse engagement step, a cantilever-type probe is moved from a few millimeters (or even centimeters) above the sample surface to a position less than 1 millimeter (for instance a few 100 μm) above. After this step, a fine engagement is started: The cantilever is moved in steps of a few micrometers until it reaches its final starting position for the measurement.

However, in order to save time, it is desired that the first coarse engagement step is done quickly, but without moving the cantilever too fast and too close to the sample and thus damaging the cantilever tip and/or the sample.

Thus, in scanning probe microscope systems, it is desired to situate the probe and the sample in close vicinity prior to the final engagement procedure. This engagement is typically a slow process, which duration scales linearly with the gap that needs to be covered, thus minimizing the duration of this process and the size of this initial gap is desirable to improve throughput of the instrument. While moving the cantilever towards the sample or vice versa, caution should be taken since accidental contact of the cantilever with the sample can damage the tip and/or sample and/or instrument. In particular in case of very polished or transparent samples, it can be difficult to judge the sample height. Furthermore, if the samples that the instrument can measure are large in the vertical dimension, the distance covered by the stage controlling the cantilever-sample separation needs to be large as well. In this case, for low height samples the coarse approach time can be long if the feedback of the position is not reliable and the operator may err on the side of caution.

If the samples that the instrument admits are also large in the horizontal dimension and have significant variations in height, the operator should also take care not to crash against high features when translating laterally.

In this context, the operator has either to:
  monitor in-situ the coarse approach by eye. This requires a good view of the sample/measuring head, which usually involves opening any enclosure around the system. The system may be destabilized (temperature, atmosphere, pressure, contamination) by this operation.
  monitor the approach by comparing the top-down view focus of sample and probe (typically with microscope optics). This can lead to crashes when the top surface is not easy to focus, for example if the material is transparent or very polished and the surface is clean of contamination. These types of surfaces (very clean, optically flat) are common in SPM. This is also problematic when the sample has a degree of tilt that makes some areas of the sample exceed the depth of field of the microscope optics so not all the field of view can be focused at once.
  monitor the approach from a position aside and above sample and probe, thus providing a steep oblique view on the area of interest.

SUMMARY

There may be a need to enable approaching a probe of a scanning probe microscope relatively to a sample in a quick way without the danger of damage.

A scanning probe microscope and a method of monitoring a gap between a probe and a sample of a scanning probe microscope according to the independent claims are provided.

According to an exemplary embodiment of the invention, a scanning probe microscope for analysing a sample by moving a probe and the sample relative to one another is provided, wherein the scanning probe microscope comprises a detection unit for or configured for detecting an image of a gap between the sample and the probe in a substantially horizontal side view (which may or may not involve a horizontal alignment of the detection unit, as long as the image of the gap captured by the detection unit corresponds to a substantially horizontal side view of the gap).

According to another exemplary embodiment of the invention, a method of monitoring a gap between a probe and a sample of a scanning probe microscope is provided, wherein the method comprises detecting an image of the gap in a substantially horizontal side view.

OVERVIEW OF EMBODIMENTS

In the context of the present application, the term "substantially horizontal side view" may particularly denote that the detection unit is configured so that it can detect an image of the gap between the probe and the sample along an effective viewing direction which does not deviate significantly from a purely horizontal direction, when the sample and the probe are spaced in a vertical direction. This may involve a fully horizontal viewing angle of zero or such a small viewing angle that a substantially true detection of the true dimension of the gap is possible from this viewing direction. A person skilled in the art will certainly understand that, due to alignment tolerances or the like, there may be a slight deviation from a purely horizontal arrangement or viewing direction.

According to an exemplary embodiment of the invention, a scanning probe microscope is provided in which a gap between a probe and a sample can be truly detected in a reliable way so that at least a coarse adjustment of the probe and the sample relative to one another can be established in a short time. This can be accomplished without any risk of damage to a probe and/or sample by an unintentional collision of the probe and the sample, in particular due to an excessive approach between these two bodies as a result of an erroneously or inaccurately determined gap. By taking an image of the gap in a precise or approximate horizontal view rather than from a large oblique viewing angle, the true dimension of the gap between probe and sample can be easily, quickly and reliably determined. This determined information, which may also be detected repeatedly, may be used for controlling the procedure of approaching sample and probe.

More specifically, exemplary embodiments of the invention provide a real side view sensor, i.e. a detection unit in form of an observation system (which may comprise a camera, a sensor, etc.) that is able to capture a horizontal view of the scene, i.e. the area of interest in form of the gap between the probe (for instance a cantilever tip) and the sample surface. "Horizontal" may denote in this context that the optical detection path is parallel or at least substantially parallel to the x-y-plane of the measurement system (the z-direction being the direction of vertical movement of probe and/or sample stage). Horizontal hence also includes directions or planes that are slightly slanted or tilted. The deviation from the horizontal plane should be preferably less than 5°, in particular less than 2° or even less than 1°, particularly preferably less than 0.5°. It should be considered that a horizontal view not necessarily requires that the observation device or detection unit (for instance one or more cameras) itself is placed in the respective horizontal plane, since also folded optical paths may be implemented.

In the following, further exemplary embodiments of the scanning probe microscope and the method will be explained.

In an embodiment, the image in the substantially horizontal side view is detected at an angle of less than 5°, in particular of less than 2°, to a horizontal axis. It has turned out that with very small angular discrepancies from a purely horizontal side view, it is still possible to obtain meaningful and reliable information with regard to the dimension of the gap between sample and probe. By allowing relatively small deviations from a pure horizontal arrangement of the detection unit, a scanning probe microscope is provided which is tolerant against small inaccuracies. It has turned out that in particular with deviations of less than about 5°, quick alignment of the system is possible without excessively compromising on precision of gap detection and failure-free coarse adjustment.

In an embodiment, the scanning probe microscope comprises a drive unit configured for moving the probe and/or the sample for mutually approaching probe and sample from an initial distance of for instance at least 3 mm (in particular of at least 5 mm) to a final distance of for instance less than 1 mm based on the detected image of the gap. Therefore, the drive unit may be capable of establishing an (in particular a coarse) adjustment of a desired distance between probe and sample in a quick and reliable way. Controlling the approaching of these two elements up to an already small distance under consideration of the determined gap size derivable from the detected image, there is no risk of an undesired collision between probe and sample. In view of the horizontally detected gap size, it can be determined very precisely, and the (for instance coarse) adjustment can be made very accurately and reliably as well. Therefore, the beginning of the actual scanning probe microscope investigation can be performed very quickly.

In an embodiment, the drive unit is configured for moving the probe and/or the sample for mutually approaching probe and sample from the initial distance to an intermediate distance with a first velocity and subsequently from the intermediate distance to the final distance with a second velocity smaller than the first velocity. This slower approaching motion may be controlled by measuring the probe (in particular cantilever) deflection, i.e. by detecting the atomic or molecular forces between probe tip and sample surface and calculating the distance. Additionally or alternatively, also the motion with the second velocity may be based on or determined from the detected image of the gap.

In an embodiment, the portion of the drive unit accomplishing the approaching from the initial distance to the intermediate distance may be embodied as one driving stage (for instance a motorized driving stage). The portion of the drive unit accomplishing the approaching from the intermediate distance to the final distance may be embodied as a combination of two driving stages, for instance the driving stage used for the approaching from the initial distance to the intermediate distance in combination with an additional stage (for instance a piezo stage). According to this embodiment, the above described coarse adjustment may be followed by a fine adjustment which shall be conducted with a lower velocity so as to prevent undesired collision of probe and sample as a consequence of unavoidable remaining inaccuracies. Dividing the approaching procedure into a first portion in which probe and sample may be approached quickly may be followed by a second procedure in which the approaching is continued with a smaller velocity. Due to the improved accuracy of the determination of the gap size in view of the substantially horizontal side view of the detection unit, the first velocity may be increased or the beginning of the second fine adjustment can be postponed. This speeds up the entire procedure of preparing the scanning probe microscope before starting an experiment.

In an embodiment, the drive unit is configured for being operable manually by an operator or automatically under control of a control unit. When the detected image is displayed to a human operator, the human operator is enabled to reliably adjust the distance between probe and sample before starting the actual experiment. While continuing to detect images of the gap during this approaching procedure, an operator may retrace the progress of the approaching procedure and may therefore adjust the distance between probe and sample reliably. Alternatively, it is also possible that the determined gap size, which can also be detected automatically by image processing (such as image recognition) or the like, is taken as a basis for a machine controlled adjustment of a starting position between probe and sample before beginning with a scanning probe microscope analysis. Both approaches can be conducted with high reliability in view of the image of the gap detected from a true side view.

In an embodiment, the detection unit is configured for being capable of detecting a size or dimension of the gap (i.e. a distance between probe and sample) for samples of different sizes, without readjustment of the optical system. In such an embodiment, the detection unit is configured so as to be capable of detecting images and gap sizes over a broad range. For example, the scanning probe microscope may be configured to operate with samples having a thickness of up to 30 mm. This allows to mount the optical system of the detection unit once and maintain its alignment without frequent modifications even when the size and/or shape of the sample or a starting distance between probe and sample changes. Rendering a readjustment of this optical system dispensable allows a user to operate the scanning probe microscope without being prone to failure or inaccuracies. In particular a highly preferred implementation of a telecentric optical system facilitates measurements with such samples.

In an embodiment, the scanning probe microscope comprises an illumination unit configured for illuminating the gap with electromagnetic radiation, in particular from a substantially horizontal side position. As the detection unit, also the illumination unit may or may not be horizontally aligned, as long as the electromagnetic radiation beam generated by the illumination unit propagates along or around the gap in a substantially horizontal propagation direction. This may or may not involve a folded beam path, in particular between illumination unit and gap. Such an illumination unit may emit electromagnetic radiation (in particular visible light, alternatively ultraviolet radiation or infrared radiation) so as to illuminate the gap and thereby improve the contrast between gap on the one hand and probe and sample on the other hand on the detected image(s). By taking this measure, the accuracy of identifying the gap on the image can be improved, and thereby the accuracy of the adjustment of the probe-sample distance can be improved. When the illumination unit is also arranged in a substantially horizontal side position (as described above for the detection unit), the electromagnetic radiation beam may propagate substantially along a straight direction between illumination unit and detection unit. This additionally contributes to a high accuracy of the detection. It should however be said that, in another embodiment, in which sufficient light from the surrounding is present, it is also possible to omit the illumination unit.

In an embodiment, an optical path between the illumination unit and the detection unit is an unfolded linear optical path (see FIG. 4 for a part of such a path). Such a configuration can be implemented with very low hardware effort and is not prone to optical artefacts.

In another embodiment, an optical path between the illumination unit and the detection unit is a folded optical path, in particular comprising one folding position (see FIG. 2) or two folding positions (see FIG. 1). Such an embodiment is advantageous in particular when there are constraints in terms of apparatus components making a linear part impossible or inappropriate. In such a scenario, any free spatial regions (not occupied by components of the scanning probe microscope) can be used for accommodating the illumination unit and/or the detection unit. One folding position may fold the optical path between the illumination unit and the gap between probe and sample. Additionally or alternatively, another folding position may fold the optical path between the gap between probe and sample on the one hand and the detection unit on the other hand.

In an embodiment, the detecting unit and the illumination unit are arranged on opposing sides of the sample and the probe so that the electromagnetic radiation propagates from the illumination unit via the gap to the detection unit. It should be said that the illumination unit and the detection unit can either be arranged along the propagation direction of the electromagnetic radiation while propagating through the gap. However, alternatively, it is possible to implement one or more deflection mirrors or other optical elements (e.g. lens, plate, wedge and/or prism) which modify the propagation direction of the electromagnetic radiation so that the actual arrangement of the detection unit and/or of the illumination unit can deviate from the propagation direction of the electromagnetic radiation beam during passing the gap. While the former embodiment allows for a very short optical path which is neither prone to failure nor unduly limits the intensity of the electromagnetic radiation beam from its way from the illumination unit to the detection unit, the latter embodiment provides a higher degree of freedom where to arrange the detection unit and/or the illumination unit.

In an embodiment, the illumination unit is configured for homogeneously illuminating the gap. In the context of the present application, the term "homogeneously illuminating" may particularly denote that the intensity of the electromagnetic radiation beam is substantially or entirely the same over the entire extension of the gap, for instance deviated over the gap extension by less than 10%. By taking this measure, any optical artefacts resulting from an inhomogeneous illumination of the gap, and which may lead to an erroneous determination of the gap and its size from the image, may be prevented. In an empty scene (in which no sample or cantilever-type probe is visible), any deviation from homogeneity will be perceived by the sensor or detection unit as different levels of intensity (in particular over the gap extension). The contrast of this empty image sets a limit for the optical density of objects recognizable on the scene. That is, if for example a transparent or semi-transparent sample is placed in the apparatus, the contrast of the resulting image should be significantly higher than the illumination inhomogeneity, to ensure that the detection of the sample boundaries by either a human operator or a computer algorithm has a high reliability and accuracy.

There are various possibilities as to how a homogeneous illumination can be accomplished according to different embodiments. In one embodiment, an optical element accomplishing this is a prism with grinded faces placed in the propagation path of the electromagnetic radiation. In another embodiment, homogeneous illumination can be accomplished by a diffuser, which may be embodied as a stack of diffusive surfaces. A diffuser may be realized in transmission geometry (so that the light beam propagates through the diffuser and is thereby rendered homogeneous or more homogeneous) or in reflection geometry (so that the light beam is reflected at the diffuser and is thereby rendered homogeneous). In yet another exemplary embodiment, homogeneous illumination may be obtained by implementing a bundle of fibers, acting as light guides. In each of the mentioned embodiments, a light-emitting diode may be used for example as electromagnetic radiation source.

In an embodiment, the scanning probe microscope comprises an optical system between the detection unit and the gap. Such an optical system may comprise one or more optical elements, such as lenses, mirrors, apertures, beam splitters, etc. Such an optical system may manipulate the radiation beam before it reaches the detection unit (such as a CMOS detector or a CCD detector or an array of photodiodes).

In a highly preferred embodiment, the optical system is a telecentric optical system, in particular a telecentric optical system providing a magnification which is independent or substantially independent (in particular with a deviation of not more than 10%) of a distance between the gap and the detection unit. When a telecentric optical system is implemented, the telecentric system may be positioned far away from the sample. This significantly simplifies implementation of a true side view, because this allows to meet size constraints of the apparatus which, in many geometrical embodiments, does not allow positioning of the optical system very close to the sample and the probe. However, when a telecentric optical system is used, the distance between the optical system and the arrangement of sample, probe and gap in between may be far away without reducing the size of the gap on an image captured by the telecentric optical system. It is a characteristic of a telecentric optical system that the gap size, as it appears on an image captured by the detection unit, is substantially independent from the distance between the image detecting surface of the detection unit and the position of the gap. With such a highly preferred embodiment implementing a telecentric optical system, it is possible to obtain a gap detection architecture which is very robust against misalignment, tolerances and the like. A telecentric optical system has the property that it maps the image of the gap onto a light sensitive detector of the detection unit in such a way that the size of the gap does not depend on a distance between the gap and a position of the detecting unit. Providing a telecentric optical system also renders it dispensable to frequently readjust the optical system or the elements of the scanning probe microscope as a whole.

A telecentric lens, which may be implemented in a telecentric optical system according to an exemplary embodiment, is a compound lens that has its entrance or exit pupil at infinity. In the prior case, this produces an orthographic view of the gap. This means that the optical system selects the principal rays, i.e. the rays which are parallel to the optical axis in front of or behind the system, respectively. A simple way to make a lens telecentric is to put the aperture stop at one of the lens's focal points. An entrance pupil at infinity makes the lens object-space telecentric, so that image magnification is independent of the gap's distance or position in the field of view of the detection unit.

In an embodiment, the optical system comprises at least one lens, in particular two lenses. When the optical system comprises only one lens, the loss of intensity of the electromagnetic radiation beam upon propagating through the optical system can be kept very small. Therefore, a high quality of the detected image of the gap may be obtained so that the determination of its size, shape, etc. can be rendered very precise. However, when implementing two lenses, optical artefacts may be strongly suppressed and a highly true image of the gap may be projected onto the detection unit.

In a preferred embodiment, one of the at least one lens is located at a distance from the detection unit which corresponds at least substantially to a focal length of this lens. By taking this measure, a size of the gap on a detected image is truly independent of the distance between the gap and the detection unit.

In an embodiment, the scanning probe microscope comprises a determining unit configured for determining a quantitative value of the distance between the sample and the probe based on the detected image. Determining such a quantitative distance between probe and sample allows the adjustment of the mutual spatial relationship between probe and sample very quickly. Such a determination may be carried out by image processing or manually by an operator by displaying also a scale on a display of the detected image of the gap. By determining the distance, a simple and automatically processable parameter may be determined which may be of high value for the adjustment procedure.

In an embodiment, the scanning probe microscope may comprise at least two detection units arranged around an array composed of the probe and the sample, each detecting unit being arranged for detecting a substantially horizontal side view of the gap from another direction. Thus, at least two detection units may be arranged around the sample-probe array, each detecting a substantially horizontal side view from another direction. This renders a positional adjustment between probe and sample very convenient and precise.

In an embodiment, the scanning probe microscope comprises an optical manipulation unit configured for manipulating electromagnetic radiation propagating (for instance from the gap) towards the detection unit, in particular a grinded prism for generating a set of parallel rays of electromagnetic radiation with homogeneous intensity. By generating a set of parallel light beams, the illumination and detection procedure may be rendered highly accurate. Optical artefacts may be strongly suppressed.

In an embodiment, the scanning probe microscope is configured as atomic force microscope. However, other types of scanning probe microscopes may be equipped with the detection unit for detecting the gap between probe and sample as well. An example for such an alternative scanning probe microscope, which may be implemented according to an exemplary embodiment of the invention, is a scanning tunneling microscope, in which a stimulating current is applied to a tip so that, due to a tunnel effect, a measured response current depends on an actual force present between tip and sample.

Other examples for a scanning probe microscope, which may be implemented according to exemplary embodiments of the invention, are a scanning near-field optical microscope (SNOM), a tip-enhanced Raman spectroscopy (TERS) microscope, or a magnetic force microscope (MFM).

BRIEF DESCRIPTION OF THE DRAWINGS

The aspects defined above and further aspects of the invention are apparent from the examples of embodiment to be described hereinafter and are explained with reference to these examples of embodiment.

DETAILED DESCRIPTION OF EXEMPLARY EMBODIMENTS

Figure 1:
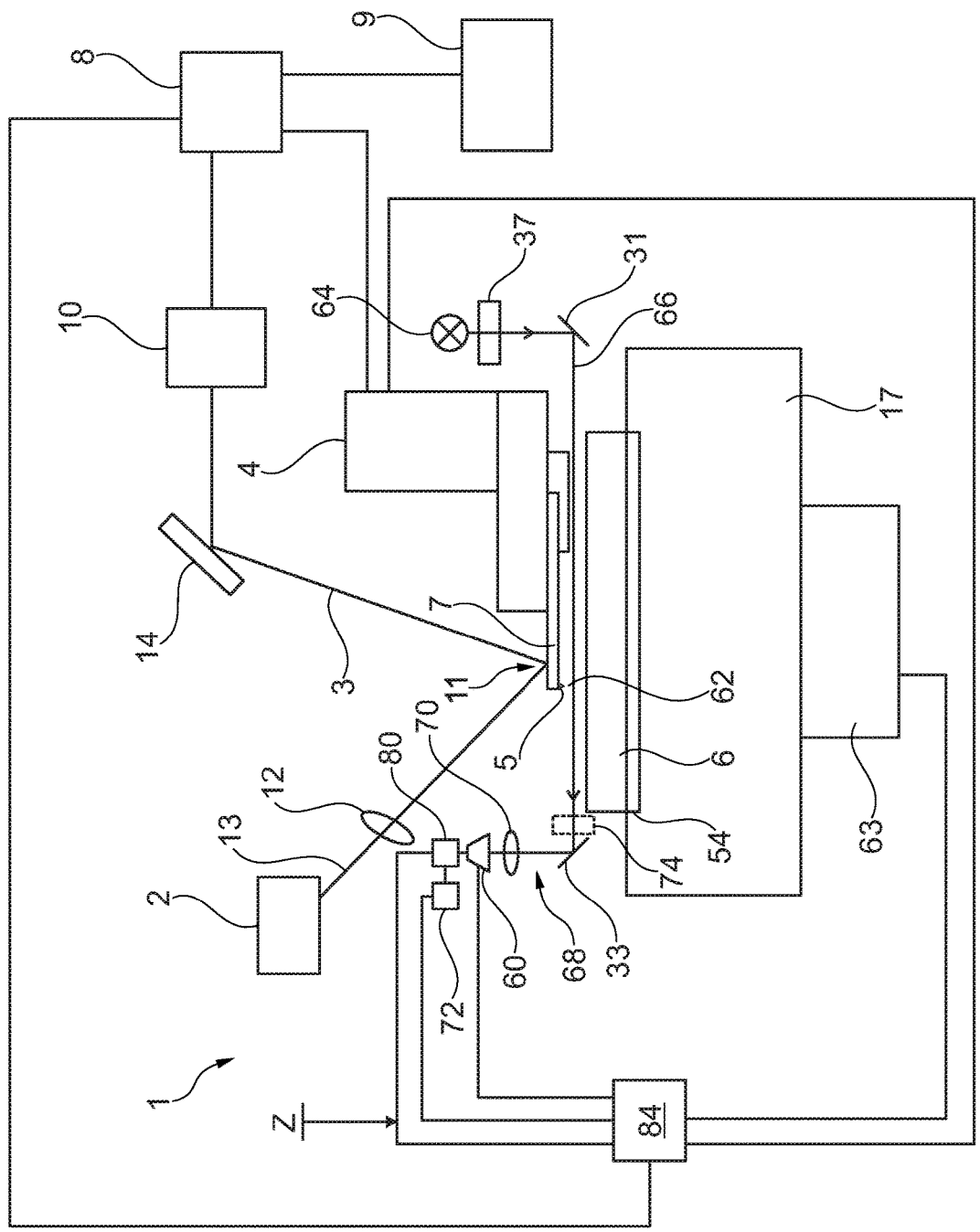
FIG. 1 shows a scanning probe microscope according to an exemplary embodiment of the invention.

The illustrations in the drawings are schematically presented. In different drawings, similar or identical elements are provided with the same reference signs.

Before, referring to the drawings, exemplary embodiments will be described in further detail, some basic considerations will be summarized based on which exemplary embodiments of the invention have been developed.

According to an exemplary embodiment of the invention, a side view sensor for assisting a fast coarse approach between a sample and a probe of a scanning probe microscope is provided. Such an embodiment may provide a reliable view of the sample-probe separation to aid in the coarse approach operation. A preferred embodiment of the invention provides a telecentric view of the scene between sample and probe. This view offers good contrast even when the sample includes transparent layers and enables accurate measurement of the distance between sample and cantilever. Embodiments of the invention provide a large field of view compared to conventional systems, allowing larger samples to be examined in the system. A view obtainable by embodiments of the invention is properly compatible with automated processing and automated or remote guidance of the instrument. The use of a true side view (i.e. exactly or approximately 90° from a top-down axis instead of an oblique view) in a scanning probe microscope instrument enables an operator to monitor a distance between probe and sample. Optical components of the system may or may not be placed in the side view axis, as long as the view is captured that is seen along that axis. An appropriate true side view optics is telecentric so the distance can be judged accurately for multiple sample-probe positions with respect to the optical axis of the side view system.

In an embodiment, the output of the side view system can be used as input for the operator and/or also for automated procedures (for instance a coarse approach to the sample, a crash avoidance mechanism, etc.). In another embodiment, the output of the side view system can be used for remote operation of the instrument, avoiding destabilization of conditions such as temperature, pressure and/or humidity (due to opening sample chambers) and additional waiting times. It is also possible that the output of the side view can be calibrated to provide quantitative information about the distance between probe and sample and also about the sample geometry. It is also possible that two side view systems looking at orthogonal directions can be combined to increase safety and speed of sample navigation.

A side view system of an embodiment of the invention may implement a source (for instance LED arrays, diffusors, light guides) of homogenous illumination covering an expected range of sample heights. In an embodiment, a side view telecentric optics may be combined with a grinded glass prism to generate a set of parallel rays with homogeneous intensity over the whole field of view. A preferred embodiment of the invention uses an object-space telecentric optical system which may provide a magnification independent of the object's distance from the sensor/lens and the position of the object in the field of view of the system.

Components of a telecentric optical system may be a pinhole, one or more lenses, an optical member ensuring parallel rays, an electromagnetic radiation source generating a homogeneous illumination, and a light and camera arrangement as detection unit. In a preferred embodiment, the propagation path of an electromagnetic radiation beam is from a light source, through or to a diffusor, to the gap between probe and sample, and from there to a sensor, so that the light passes through the sample-cantilever gap and reaches the sensor. In this arrangement, the contrast between the solid parts and the gap between them is very high.

Other embodiments of the invention may have the light source and the sensor situated at the same side of the sample, or at an angle. In such as arrangement, the light that the sensor receives may bounce from the sample. This may provide even more details about the sample.

Other exemplary embodiment may implement two or multiple light sources. A first light source may be situated so that the light passes through the sample-cantilever gap and reaches the sensor. The second light source may be situated at the same side of the sample, or at an angle. In such an arrangement, the light that the sensor receives can bounce from the sample. Also such an embodiment may provide more details about the sample.

Having a high contrast between the solid parts and air helps the operator to decide where the solid parts end. Furthermore, if the scene acquired by the side view sensor is used as an input for machine vision and/or automatic control of the instrument, the threshold used to automatically detect which regions of the image correspond to a sample or cantilever is directly related to the contrast of the image.

In a preferred embodiment, the light source is homogeneous over an area covering the full scene seen by the sensor or detection unit. In an empty scene (i.e. no sample or cantilever visible), any deviation from homogeneity may be perceived by the sensor as different levels of intensity. The contrast of this empty image sets a limit for the optical density of objects recognizable on the scene. That is, if for example a transparent or semi-transparent sample is placed in the instrument, the contrast of the resulting image must be significantly higher than the illumination inhomogeneity or the detection of the sample boundaries by either a human operator or a computer algorithm will not be reliable.

In an embodiment, a method to monitor the gap between cantilever and sample is provided. Moreover, a method to move the relative distance between tip and sample from a distance larger than 5 mm (or even larger than 10 mm or 20 mm) to a distance smaller than 1 mm (or even smaller than 0.5 mm or 0.1 mm) is provided. In another embodiment, a method to quickly approach the cantilever to a sample or the sample to a cantilever from a distance so large that fine engagement is unpractical to a distance where the fine engagement takes one minute or less is provided. Furthermore, an apparatus is provided in which a setup is fixed with respect to a sample with a large vertical field of view that eliminates the need to adjust or reconfigure the configuration to variant sample heights. It is also possible to carry out a lens distortion correction, scene stitching, etc.

FIG. 1 shows a scanning probe microscope (SPM) 1 according to an exemplary embodiment of the invention being embodied as atomic force microscope (AFM).

In the scanning probe microscope 1, an elongation of a probe 11, i.e. a change of position or shape of the probe 11 (which can be embodied as a cantilever 7 with a protruding tip 5) when moving along a surface of a sample 6 can be detected by an optical sensor system. In this context, an electromagnetic radiation source 2 (for instance a laser source) emits a primary electromagnetic radiation beam 13 (in particular a light beam) which propagates via a focusing unit 12 (which may be embodied as an array of one or more optical lenses) onto the probe 11. A secondary electromagnetic radiation beam 3 is generated by reflection of the primary electromagnetic radiation beam 13 at an upper surface of the probe 11. The secondary electromagnetic radiation beam 3 propagates to a photosensitive and position sensitive detector 10 (in particular, the secondary electromagnetic radiation beam 3 can be deflected by a deflection mirror 14 or another optical deflection element onto the detector 10. When the measuring probe 11 is moved by an actuator 4 (which can trigger a position change in the vertical direction according to FIG. 1) and/or when the measuring probe 11 changes its shape, a modification of the laser light can be detected at the position sensitive detector 10. Depending on the interaction of a measurement tip 5 (which can also be denoted as cantilever tip) of the probe 11 with sample 6 under analysis or to be characterized and being arranged on a sample holder 54 or directly on a sample support 17, the response of the probe 11 will vary and a corresponding region of the detector 10 will be impinged by the secondary electromagnetic radiation beam 3. The detector signal may be processed in an evaluation unit 8. The generated high resolution image of the surface of the sample 6 can be displayed by a display unit 9. A surface of the sample 6 can be scanned by measuring tip 5 (i.e. with sensitive tip 5 of the probe 11). The sample support 17 can be moved in a horizontal plane (i.e. in an x-direction and in a y-direction perpendicular to the shown z-direction). Hence, the scanning probe microscope 1 serves for determining surface information concerning the sample 6 by scanning a surface of the sample 6 by the probe 11. In the scanning probe microscope 1, the sample 6 can thus be analysed by moving probe 11 and sample 6 relative to one another.

As can be taken from FIG. 1, the scanning probe microscope 1 comprises a detection unit 60 (which may comprise a camera such as a CCD camera or a CMOS camera) configured for detecting an image of a gap 62 between the sample 6 and the probe 11 in a substantially horizontal side view. This substantially horizontal side view of the gap 62 is detected by a light beam (see electromagnetic radiation beam 66) propagating at an angle of less than 2° with regard to a horizontal axis (which is arranged perpendicular to the shown z-direction). More precisely, the detection unit 60 is configured to detect the image of the gap 62 between the vertically spaced (see z-direction) sample 6 and probe 11 as it would be seen when looking to the gap 62 substantially along the horizontal direction. To meet constraints of the positioning of various elements of the scanning probe microscope 1 close to the sample 6 and the probe 11, the detection unit 60 is located at the end of a here double folded optical path (see mirrors 31, 33) despite of the fact that the image of the gap 62 captured by the detection unit 60 equals to an image as would be obtained when the detection unit 60 was located at an end of a fully horizontal unfolded optical path defined by the electromagnetic radiation beam 66 propagating substantially horizontally in the region of the gap 62 between the mirrors 31, 33. Due to the true side view detection architecture shown in FIG. 1, the detection unit 60 is configured for being capable of detecting a vertical size of the gap 62 for samples 6 of different sizes without readjustment of the optics of the scanning probe microscope 1. For instance, samples 6 with dimensions up to 30 mm or more may be detected precisely.

The scanning probe microscope 1 moreover comprises a drive unit 63 configured for driving or moving, in terms of a coarse adjustment and/or a subsequent fine adjustment of a spatial probe-sample relationship, the sample 6 relative to the probe 11 for mutually approaching probe 11 and sample 6 from an initial distance of for instance 10 mm to a final distance of for instance 0.2 mm based on the detected image of the gap 62 and optionally additionally based on information obtained from detector 10. More specifically, the drive unit 63 is configured for moving the sample 6 with respect to the probe 11 for mutually approaching probe 11 and sample 6 from the initial distance to an intermediate distance with a first velocity in terms of the coarse adjustment for which the detected image of the gap 62 may be used.

Alternatively, the drive unit 63 can also be configured for moving the probe 11 with respect to the sample 6 for mutually approaching probe 11 and sample 6 from the initial distance to an intermediate distance with a first velocity in terms of the coarse adjustment for which the detected image of the gap 62 may be used.

Subsequently, probe 11 and sample 6 may be further approached from the intermediate distance to the final distance with a second velocity smaller than the first velocity, for instance based on data from the detector 10. With the detected information of the precise size of the gap 62, as accurately determined based on the true side view image detected by the detection unit 60, the coarse adjustment can be carried out at the high first velocity without the risk of an undesired collision of probe 11 and sample 6. The drive unit 63 can be operated manually by a user or automatically under control of a control unit 84 (such as a processor). Control unit 84 may control operation of the scanning probe microscope 1 and may for this purpose be coupled to at least some of the elements according to reference numerals 4, 8, 60, 63, 72 and 80.

Furthermore, the scanning probe microscope 1 comprises an illumination unit 64 configured for illuminating the gap 62 with electromagnetic radiation 66, for instance a beam of visible light, from a substantially horizontal side position via the double folded optical path according to FIG. 1. Hence, the optical path between the illumination unit 64 and the detection unit 60 is a folded optical path comprising two folding positions defined by two reflection mirrors 31, 33. The detecting unit 60 and the illumination unit 64 are arranged on opposing ends of the doubled folded optical path with the sample 6 and the probe 11 spaced by the gap 62 in an intermediate position. Thus, the electromagnetic radiation 66 propagates from the illumination unit 64 via mirror 31, via the gap 62 and via mirror 33 to the detection unit 60. Advantageously, the illumination unit 64 is configured for homogeneously illuminating the gap 62 with substantially identical intensity over its entire width.

Optical system 68 is arranged between the gap 62 and the detection unit 60 and is preferably configured as a telecentric optical system providing a magnification independent of a distance between the gap 62 and the detection unit 60. The telecentric optical system 68 comprises a lens 70 arranged at a distance to the detection unit 60 corresponding to a focal length of the lens 70.

A determining unit 80 is provided with image data indicative of the image as detected by the detection unit 60 and is configured for determining a quantitative value of the distance or gap size between the sample 6 and the probe 11 based on the detected image. This value may be supplied to the control unit 84 and may serve as a basis for the control of the drive unit 63 by the control unit 84. An optional processing unit 72 is configured for processing multiple horizontally detected images generated by the detection unit 60. Alternatively or additionally, the detected image may be displayed on a screen and thus can be observed by an operator.

An optical manipulation unit 74 may be provided and configured for manipulating the electromagnetic radiation 66 propagating from the gap 62 towards the detection unit 60 for generating a set of parallel rays of electromagnetic radiation 66 with homogeneous intensity.

The detection unit 60 may comprise a camera providing information used for a vertical or z-alignment. In an embodiment, this camera does not generate an image of the sample surface but observes or measures the vertical distance between the probe 11 and the sample 6. This information can be used for safely approaching of the cantilever-type probe 11 towards the sample 6. In an embodiment, the detection unit 60 detects an image of the gap 62, not of any feature of the sample 6 or the probe 11. This can be accomplished by a fixed setup of light source, camera and the other components of the scanning probe microscope 1 as shown in FIG. 1. These components may have a fixed position with reference to an AFM frame and/or the sample-holding component (i.e. the base of the stage).

In the following, operation of the scanning probe microscope 1 will be explained. Before starting to initiate an actual scanning probe microscope measurement, the mutual positioning between the sample 6 and the cantilever 7 needs to be adjusted. For that purpose, the sample 6 and the cantilever 7 are firstly placed at a sufficiently high distance of for instance 10 mm so that any damage of undesired collision or impingement between sample 6 and cantilever 7 can be avoided. Subsequently, the drive unit 63 firstly approaches sample 6 and cantilever 7 by a coarse adjustment at a relatively high first velocity until sample 6 and cantilever 7 have reached a mutual distance of for instance 1 mm. In order to obtain the information how far the sample 6 and the cantilever 7 can be approached towards each other, an image of the gap 62 between the sample 6 and the cantilever 7 is detected. For this purpose, the illumination unit 64 emits an optical light beam as electromagnetic radiation beam 66. After deflection by mirror 31, the electromagnetic radiation beam 66 propagates through the gap 62 between sample 6 and cantilever 7 and then impinges on further mirror 33. A beam adjustment can be accomplished in the beam manipulation unit 74 beforehand. After having passed lens 70, the electromagnetic radiation beam 66 reaches the detection unit 60 where the electromagnetic radiation beam 66 is detected in form of an image. Based on this detected image, information concerning the gap 62 as well as its shape and size may be determined by determining unit 80. The result of this determination may be supplied, for instance via control unit 84, to drive unit 63 which can perform the coarse adjustment on the basis of the determined size of the gap 62. Due to the horizontal propagation of the electromagnetic radiation beam 66 between the mirrors 31 and 33, a horizontal image of the gap 62 can be detected by the detection unit 60. However, thanks to the presence of the detection mirrors 31 and 33, it is possible to arrange the detection unit 60 as well as the illumination unit 64 spaced with regard to the sample-probe region, where only a small space can be present for accommodating such units. The illumination unit 64 can be a light emitting diode or an array of light emitting diodes. In order to improve the homogeneity of the illumination of the gap 62, a diffuser 37 or the like may be arranged between the illumination unit 64 and the gap 62. Due to the true horizontal side view of the gap 62 captured by the described scanning probe microscope 1, the size of the gap 62 can be determined with high accuracy, and the sample-probe adjustment can be made very accurate as well.

Figure 2:
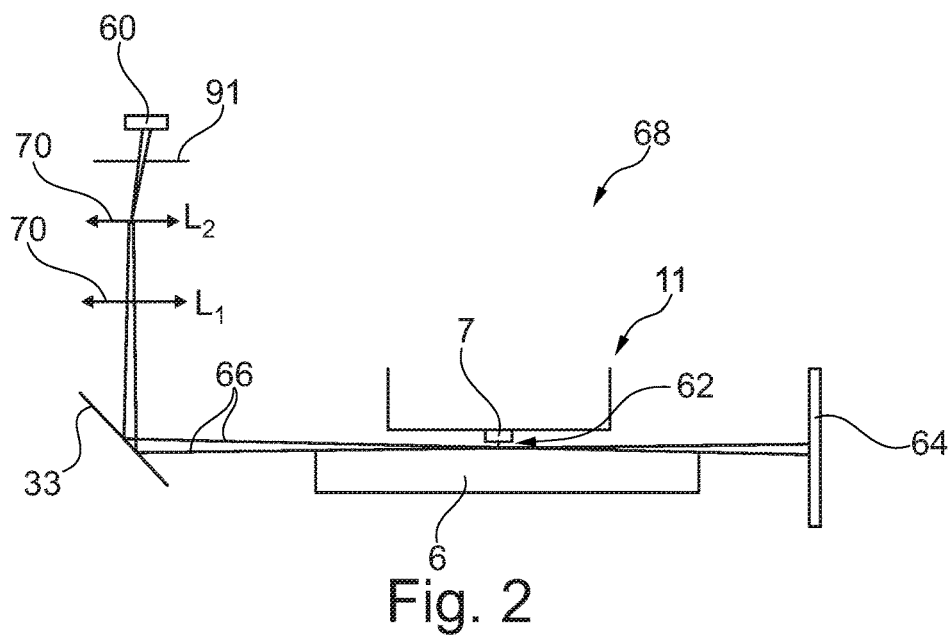
FIG. 2, FIG. 3 and FIG. 4 illustrate different cross-sectional views of optical systems of a scanning probe microscope according to exemplary embodiments of the invention.
Figure 3:
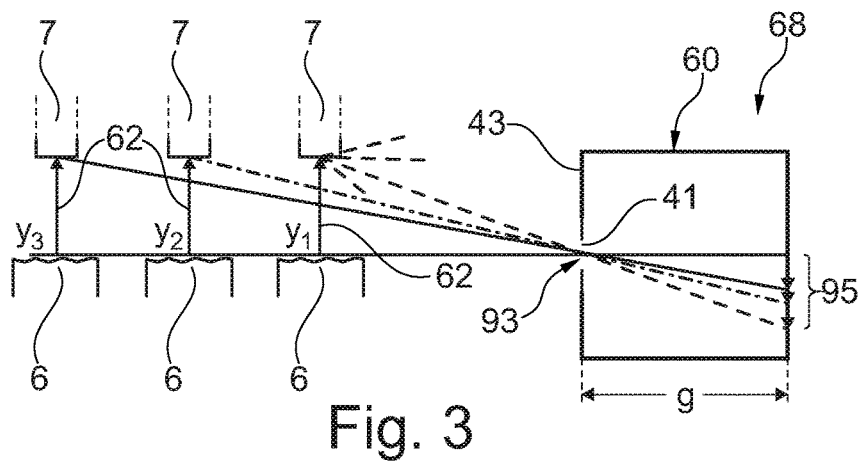
Figure 4:
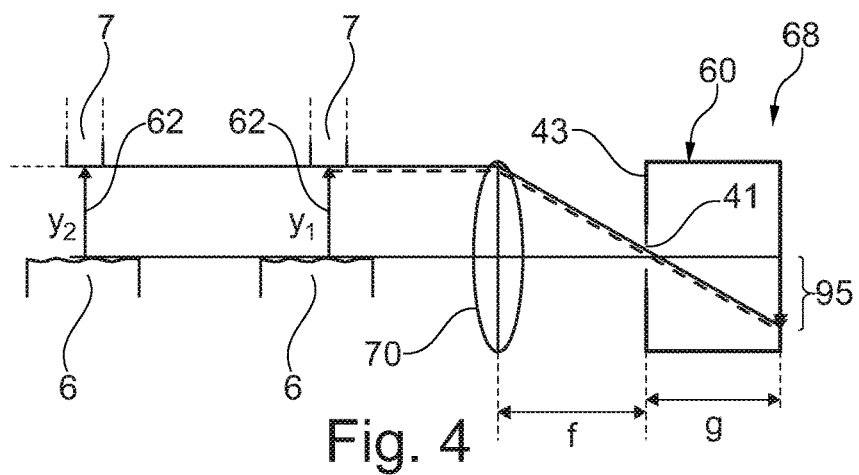

FIG. 2 to FIG. 4 illustrate different cross-sectional views of optical systems 68 of a scanning probe microscope 1 according to exemplary embodiments of the invention.

Referring to FIG. 2, an object-side telecentric side view sensor or optical system 68 is shown. In FIG. 2, an optical path between the illumination unit 64 and a light-sensitive surface of the detection unit 60 is folded as a result of the implementation of mirror 33 to meet constraints of the geometry of the scanning probe microscope 1. However, alternatively, it is also possible to have a double folded geometry as in FIG. 1 (for instance implementing two mirrors 31, 33), or a completely longitudinal optical path (in which for example no mirrors need to be implemented). Thus, according to FIG. 2, the optical path between the illumination unit 64 (providing a homogeneous illumination) and the detection unit 60 is a folded optical path comprising only one folding position.

As shown in FIG. 2, light arriving horizontally from the illumination unit 64 and passing through the gap 62 may be redirected by a mirror 33, prism or any other suitable optical element. The operator can watch an image for instance on a screen (which may also comprise a scale) and can control the approach of the probe 11 towards the surface of the sample 6 manually. The process can also be semi-automatized or fully automatized by including a control unit 84 or the like. The detection unit 60 measures the size of the gap 62 and, by processing this information, movement of the probe 11 and/or the sample 6 may be controlled.

The illumination unit 64 (such as a light source) generates a homogeneous illumination beam or electromagnetic radiation beam 66 arriving horizontally at the scene, i.e. gap 62. Contrary to FIG. 1, the illumination unit 64 is now arranged in alignment with the propagation direction of the electromagnetic radiation beam 66 at the position of the gap 62, and not perpendicular thereto. The light source itself is not necessarily positioned in the x-y-plane (as it is in FIG. 2), but light arriving from any direction above or below may be redirected into that plane. The electromagnetic radiation beam 66 should ensure a substantially homogeneous illumination of the gap 62 between sample 6 and probe 11. If intensity fluctuations or variations of the light remain sufficiently small (which means that the incoming light does not become excessively inhomogeneous), even transparent objects can be detected with high accuracy.

The incoming electromagnetic radiation beam 66 may arrive from any direction or any angle in the x-y-plane. In an exemplary embodiment of the invention, an appropriate position of the light source or electromagnetic radiation source 64 (or the related mirror 31, prism etc.) may be in a direction which is diametrically opposite to the camera or detection unit 60 (or the related mirror 33, prism, etc.).

In a preferred embodiment of the invention, a telecentric optical system 68 may be implemented. Such a telecentric optical system 68 may be telecentric in the object space. An advantage of such an optical configuration is that, on the image plane, an image of an object has the same size, independent of its distance (see FIG. 4). In other words: There is no perspective distortion in such a telecentric configuration. A telecentric optical system 68 according to an exemplary embodiment basically works with one lens 70, see FIG. 1 or FIG. 4. The configuration shown in FIG. 2 comprises two lenses 70. However, the number of lenses 70 can also be different from one or two. Downstream of the lens(es) 70, an aperture 91 may be provided through which the electromagnetic radiation beam 66 propagates before it reaches detection unit 60.

FIG. 3 shows a possible optical system 68 of a scanning probe microscope 1 according to an exemplary embodiment of the invention. Three objects (see y1, y2, y3) at different distances from a pinhole camera 43 are shown, wherein these objects (see y1, y2, y3) symbolize gap 62 between cantilever 7 and sample 6. As can be taken from FIG. 3, objects having equal dimensions y1=y2=y3 but being positioned at different distances from the pinhole camera 43 will be imaged on a detection screen or detecting surface with different sizes. When the optical system 68 of FIG. 3 is implemented, care should be taken that the sample-probe arrangement is located at a predefined position to prevent that optical artefacts are involved. Reference numeral 93 denotes a projection center, and images 95 of the objects (see y1, y2, y3) are shown as well. A distance between pinhole and detecting surface is illustrated by reference character g.

The optical system 68 shown in FIG. 4 relates to a preferred embodiment of the invention due to the implementation of a telecentric optical system 68. As the embodiment of FIG. 3, the embodiment of FIG. 4 implements an optical path between the illumination unit 64 (not shown) and the detection unit 60 which is an unfolded linear optical path.

Two objects (see y1, y2) having equal dimensions y1=y2 but being located at different distances from pinhole camera 43 are shown, wherein these objects (see y1, y2) symbolize gap 62 between cantilever 7 (or probe 11) and sample 6. With this configuration of pinhole camera 43 and lens 70, the dimension of the gap 62 to be imaged on a detection screen is independent of whether the gap 62 is located at a first position (see y1) or at a second position (see y2). The size of the gap 62 can therefore be determined precisely regardless of an exact position of a probe-sample arrangement. Highly advantageously, a distance f between the lens 70 and the aperture 41 of the pinhole camera 43 equals to a focal length of the lens 70. Images 95 of the objects (see y1, y2) have all the same (or substantially the same) size.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Implementation of the invention is not limited to the preferred embodiments shown in the figures and described above. Instead, a multiplicity of variants are possible which use the solutions shown and the principle according to the invention even in the case of fundamentally different embodiments.

The invention claimed is:

1. A scanning probe microscope using scanning probe microscopy for analyzing a sample by moving a probe and the sample relative to one another, the scanning probe microscope comprising:
    a detection unit for detecting an image of a gap between the sample and the probe in a substantially horizontal side view;
    an optical system at least partially between the gap and the detection unit, wherein the optical system is a telecentric optical system that provides a magnification independent of a distance between the gap and the detection unit;
    a drive unit configured for moving at least one of the probe and the sample for mutually approaching the probe and the sample based on the image of the gap between the sample and the probe,
    wherein the optical system comprises at least one lens and an aperture through which an electromagnetic radiation beam, after propagating through the gap, propagates before it reaches the detection unit; and
    an illumination unit configured for illuminating the gap with the electromagnetic radiation beam from a substantially horizontal side position,
    wherein the detection unit and the illumination unit are arranged so that the electromagnetic radiation beam propagates from the illumination unit through the gap to the detection unit.

2. The scanning probe microscope according to claim 1, wherein the image in the substantially horizontal side view is detected at an angle of less than 5° to a horizontal axis.

3. The scanning probe microscope according to claim 1, wherein the drive unit controllably adjusts a separation between the probe and the sample from an initial distance to a final distance of less than 1 mm, based on the detected image of the gap.

4. The scanning probe microscope according to claim 3, wherein the drive unit is configured for moving at least one of the probe and the sample for mutually approaching probe and sample from the initial distance to an intermediate distance with a first velocity and subsequently from the intermediate distance to the final distance with a second velocity smaller than the first velocity based on the detected image of the gap.

5. The scanning probe microscope according to claim 1, wherein the detection unit is configured for being capable of detecting a size of the gap for samples of different sizes without readjustment.

6. The scanning probe microscope according to claim 1, comprising at least one of the following features:
    wherein the illumination unit is configured for homogeneously illuminating the gap;
    wherein an optical path between the illumination unit and the detection unit is an unfolded linear optical path;
    wherein an optical path between the illumination unit and the detection unit is a folded optical path comprising one or two folding positions.

7. The scanning probe microscope according to claim 1, wherein at least one lens is located at a distance from the detection unit which corresponds to a focal length of the at least one lens.

8. The scanning probe microscope according to claim 1, further comprising:
    a determining unit configured for determining a quantitative value of the distance between the sample and the probe based on the detected image.

9. The scanning probe microscope according to claim 1, further comprising:
    at least two detection units arranged around an array composed of the probe and the sample, each detecting unit being arranged for detecting a substantially horizontal side view of the gap from another direction.

10. The scanning probe microscope according to claim 1, further comprising:
    an optical manipulation unit configured for manipulating electromagnetic radiation propagating towards the detection unit in a grinded prism for generating a set of parallel rays of electromagnetic radiation with homogeneous intensity.

11. A method of monitoring a gap between a probe and a sample of a scanning probe microscope, wherein the scanning probe microscope uses scanning probe microscopy to analyze a sample where the scanning probe microscope comprises a drive unit, a detection unit, an illumination unit and an optical system, the optical system at least partially between the gap and the detection unit, wherein the optical system is a telecentric optical system that provides a magnification independent of a distance between the gap and the detection unit, and wherein the optical system comprises at least one lens and an aperture through which an electromagnetic radiation beam, after propagating through the gap, propagates before it reaches the detection unit, the method comprising:
    providing the sample separated by the gap from the probe;
    illuminating, by the illumination unit, the gap with the electromagnetic radiation beam from a substantially horizontal side position, so that the electromagnetic radiation beam propagates from the illumination unit through the gap to the detection unit; and
    detecting, using the detection unit, an image of the gap in a substantially horizontal side view; and
    manipulating, by the drive unit, a distance between the probe and the sample based on the detected image of the gap.

* * * * *